(12) United States Patent
Ferenc

(10) Patent No.: US 8,517,572 B2
(45) Date of Patent: Aug. 27, 2013

(54) METHOD AND APPARATUS PERTAINING TO A CONE-SHAPED LENS IN COMBINATION WITH A LATERAL MEMBER

(75) Inventor: Kevin Thomas Ferenc, Scottsville, KY (US)

(73) Assignee: HeathCo, LLC, Bowling Green, KY (US)

( * ) Notice: Subject to any disclaimer, the term of this patent is extended or adjusted under 35 U.S.C. 154(b) by 572 days.

(21) Appl. No.: 12/775,207

(22) Filed: May 6, 2010

(65) Prior Publication Data

US 2011/0273888 A1  Nov. 10, 2011

(51) Int. Cl.
*F21V 5/00* (2006.01)
*F21V 5/04* (2006.01)

(52) U.S. Cl.
USPC . 362/326; 313/116; 362/311.01; 362/311.02; 362/311.06; 362/351; 362/355

(58) Field of Classification Search
USPC .............. 362/249.02, 294, 311.01, 311.02, 362/311.06, 307–309, 311.04, 311.05, 326–329, 362/332, 336, 351, 355, 356; 313/116
See application file for complete search history.

(56) References Cited

U.S. PATENT DOCUMENTS

| | | | |
|---|---|---|---|
| 5,519,572 A | 5/1996 | Luo | |
| D539,944 S * | 4/2007 | Egawa et al. | D26/24 |
| 2004/0095763 A1 * | 5/2004 | Guerrieri et al. | 362/240 |
| 2007/0171641 A1 * | 7/2007 | Sassoon | 362/244 |
| 2008/0239717 A1 * | 10/2008 | Chen et al. | 362/231 |
| 2009/0034283 A1 * | 2/2009 | Albright et al. | 362/545 |
| 2009/0237932 A1 * | 9/2009 | Lee | 362/249.02 |
| 2010/0091495 A1 * | 4/2010 | Patrick | 362/249.02 |
| 2011/0063831 A1 * | 3/2011 | Cook | 362/235 |
| 2011/0134634 A1 * | 6/2011 | Gingrich et al. | 362/231 |

* cited by examiner

*Primary Examiner* — Nimeshkumar Patel
*Assistant Examiner* — Steven Horikoshi
(74) *Attorney, Agent, or Firm* — Fitch Even Tabin & Flannery LLP

(57) ABSTRACT

A cone-shaped lens is integrally formed with a lateral member using a common material. The cone-shaped lens has a light-output surface having a corresponding area while the aforementioned member has an exterior same-side surface area that extends beyond the light-output surface by an amount that is at least four times the corresponding area of the cone-shaped lens's light-output surface.

34 Claims, 6 Drawing Sheets

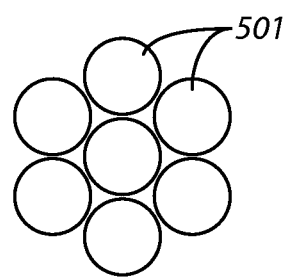
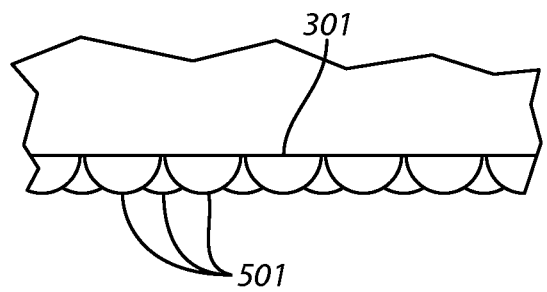
FIG. 5        FIG. 6
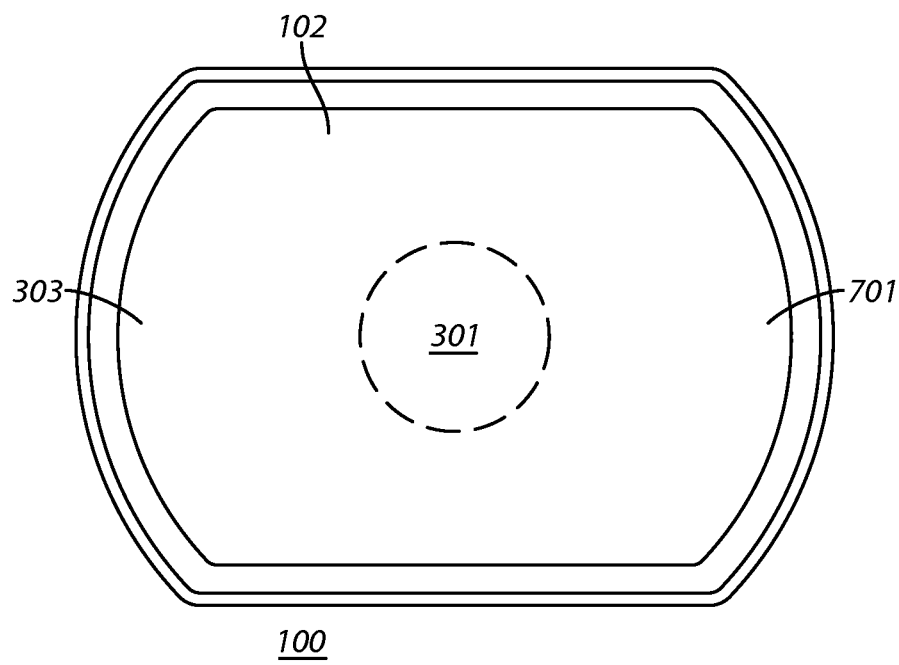
FIG. 7

METHOD AND APPARATUS PERTAINING TO A CONE-SHAPED LENS IN COMBINATION WITH A LATERAL MEMBER

RELATED APPLICATION(S)

This application is related to co-pending and co-owned U.S. patent application Ser. No. 12/059,373, entitled LIGHT FIXTURE WITH OPTIONAL ANIMATE OBJECT DETECTOR AND HEAT SINK and filed Mar. 31, 2008, which is incorporated by reference in its entirety herein.

TECHNICAL FIELD

This invention relates generally to cone-shaped lenses.

BACKGROUND

Many sources of illumination are relatively small. This can be particularly true, for example, with light-emitting diodes (LED's). By traditional considerations, LED's can seem disproportionately small as compared to their illumination capabilities. This, coupled further with a relatively long operational life and a relatively favorable operating efficiency, prompts many designers to consider using LED's as a source of illumination in various application settings.

Depending upon the application setting, however, LED's are not always well suited to meet a particular illumination requirement. To sometimes meet this concern, cone-shaped lenses have been employed to effectively increase the area from a spot of light to provide that light over a relatively larger light-output surface.

The applicant has determined that cone-shaped lenses can introduce problems of their own, however. Generally speaking, the LED must be placed relatively specifically and carefully with respect to the cone-shaped lens' apex. Assuring this registration within a desired degree of tolerance can be challenging and hence increase design and manufacturing costs. Furthermore, although a cone-shaped lens can increase the size of the light-output surface as corresponds to an LED-based lighting component, the resultant form factor may still nevertheless be inadequate to meet many of a variety of functional, mechanical, and/or aesthetic requirements.

BRIEF DESCRIPTION OF THE DRAWINGS

The above needs are at least partially met through provision of the method and apparatus pertaining to a cone-shaped lens in combination with a lateral member described in the following detailed description, particularly when studied in conjunction with the drawings, wherein:

FIG. 5 comprises a top plan detail view as configured in accordance with various embodiments of the invention;

FIG. 6 comprises a front-elevational detail view as configured in accordance with various embodiments of the invention;

FIG. 7 comprises a top plan view as configured in accordance with various embodiments of the invention;

Figure 1:
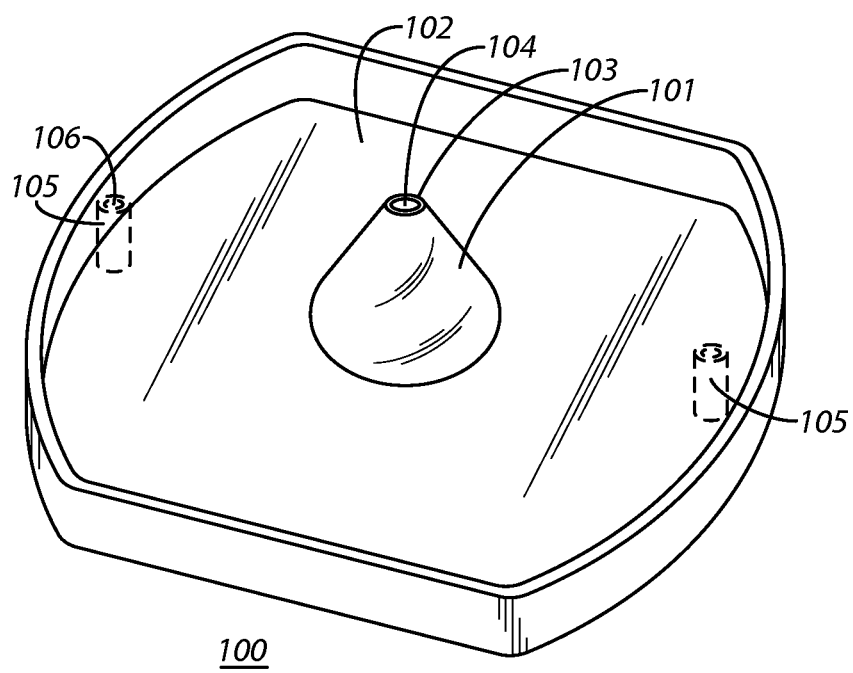
FIG. 1 comprises a perspective view as configured in accordance with various embodiments of the invention.

Elements in the figures are illustrated for simplicity and clarity but are, generally speaking, drawn to relative scale. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to these various embodiments, a cone-shaped lens is integrally formed with a lateral member using a common material. The cone-shaped lens has a light-output surface having a corresponding area while the aforementioned member has an exterior same-side surface area that extends beyond the light-output surface by an amount that is at least equal to the corresponding area of the cone-shaped lens's light-output surface exterior same-side surface area that extends beyond the light-output surface by an amount that is at least four times the corresponding area of the cone-shaped lens's light-output surface.

By one approach, the aforementioned exterior same-side surface area can be at least six times the corresponding area of the cone-shaped lens's light-output surface. By another approach, the aforementioned exterior same-side surface area can be at least eight times the corresponding area of the cone-shaped lens's light-output surface.

By one approach, the cone-shaped lens's light-output surface can be co-extensive with the aforementioned exterior same-side surface area. By another approach, these two surfaces can be physically discontinuous in a planar sense (albeit still part and parcel of a shared material and component) and can be oriented, for example, substantially parallel to one another.

Generally speaking, for many application settings, the lateral member can comprise a substantially-planar member. In such a case the longitudinal axis of the cone-shaped lens can be substantially perpendicular to the lateral member. If desired, the substantially-planar member can extend outwardly from the cone-shaped lens on all sides of the cone-shaped lens. Also if desired, the cone-shaped lens can be substantially centrally located within the lateral member.

The lateral member, if desired, can have a periphery that is thicker than an inner non-peripheral part thereof. The latter can be, for example, recessed within that peripheral portion. This can be particularly helpful when the lateral member is, at least for the most part, relatively thin (especially as compared to the cone-shaped lens). This thicker periphery may serve, for example, to aid in preserving a desired form factor for the lateral member during cooling following formation of this component using a molding process.

By one approach, part or all of the lateral member as extends beyond the cone-shaped lens's light-output surface can be optically diffuse.

By one approach the lateral member can have a plurality of posts that are configured to couple with corresponding surfaces/elements of a housing that is itself configured to engage and hold the lateral member in an installed position. A light source (such as one or more LED's) can be disposed within this housing such that the light source is automatically properly located with respect to the cone-shaped lens' apex when the lateral member is so installed.

So configured, the cone-shaped lens can be readily, easily, and reliably positioned with respect to a counterpart source of illumination as a natural result of simply installing the lateral member in the housing. The lateral member, in turn, offers great flexibility to accommodate a wide variety of lens and housing form factors. These teachings will readily accommodate, for example, lateral members having a generally rectangular shape, a generally triangular shape, a generally circular shape, a generally oval shape, and so forth as desired. This, in turn, permits these teachings to leverage the use of small intense-light sources such as LED's in application settings where designers and manufacturers might otherwise be discouraged due to functional and/or aesthetic requirements that seemed inconsistent with the ordinary operating characteristics of such light sources.

These teachings are well suited to cost-effective mass producing techniques (such as plastic molding methodologies). Accordingly, these teachings can be implemented in a highly cost-effective manner.

These and other benefits may become clearer upon making a thorough review and study of the following detailed description. Referring now to the drawings, and in particular to FIG. 1, a lens component 100 compatible with these teachings will be described.

The lens component 100 includes a cone-shaped lens 101 comprised, in this illustrative example, of an optically-clear material. A variety of plastic materials will suffice in these regards and especially clear plastic materials such as polycarbonates or various acrylics. (As used herein, this reference to "cone-shaped" will be understood to refer to both a classical-geometric cone shape as well as other shapes that are substantially cone shaped (such as, but not limited to, parabolics, pyramids and other shapes that are generally longitudinally symmetrical and have a wide base and a narrower apex.)

Figure 2:
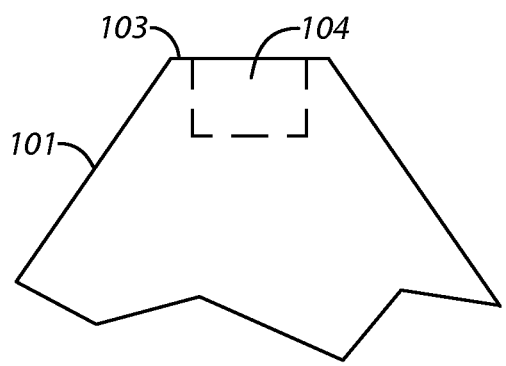
FIG. 2 comprises a front-elevational detail view as configured in accordance with various embodiments of the invention.
Figure 3:
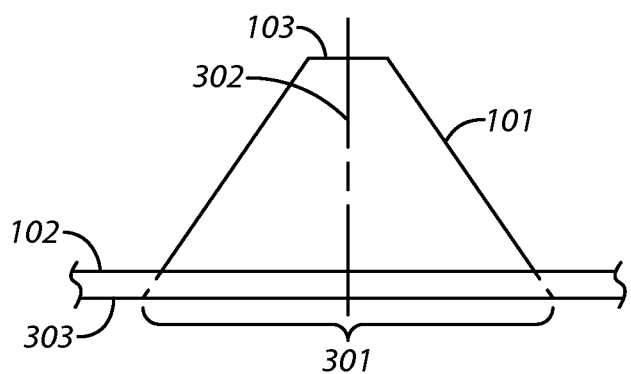
FIG. 3 comprises a front-elevational detail view as configured in accordance with various embodiments of the invention.

This cone-shaped lens 101 is formed integral to a lateral member 102 as a single unitary piece therewith. Referring momentarily to both FIGS. 1 and 2, the cone-shaped lens 101 has a truncated apex 103 having a cavity 104 formed axially therein to receive a light source such as an LED. So configured, light emitted by an LED disposed within this cavity 104 can be guided through the material comprising the lens 101 to an opposing primary light-output surface 301 as shown in FIG. 3. By one approach, this cavity 104 can have a substantially cylindrical form factor.

Figure 4:
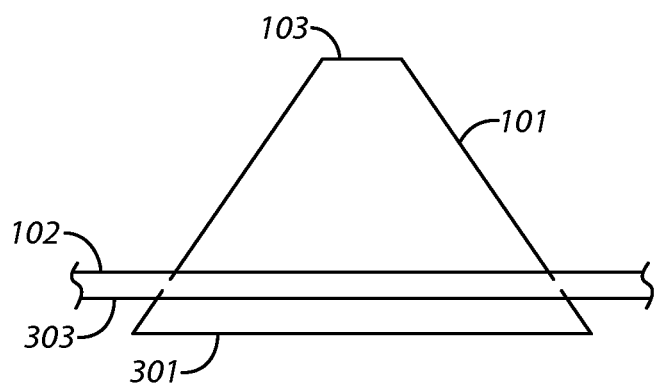
FIG. 4 comprises a front-elevational detail view as configured in accordance with various embodiments of the invention.

With momentary reference to FIG. 3, by one approach this primary light-output surface 301 can be essentially co-extant with the outer surface 303 of the lateral member 102. These teachings are flexible in application, however, and will readily accommodate other approaches in these regards. By way of illustration, for example, and as shown in FIG. 4, the cone-shaped lens 101 can extend further through and beyond the lateral member 102 such that the primary light-output surface 301 and outer surface 303 of the lateral member 102 are no longer co-planar or substantially co-planar.

With continued reference to FIG. 3, by one approach the lateral member 102 can comprise a substantially-planar member. As used herein, the expression "substantially-planar" will be understood to refer to a member that is, for the most part, planar but that may deviate generally or incrementally in small degrees from strict planarity. For example, the member may deviate generally from strict planarity by five degrees or less over the entire length of the member and still be considered "substantially planar." As another example, a given member that is otherwise "planar" may have short intermittent features that vary considerably from strict planarity but which constitute such a small part of the overall member that the overall member is still fairly viewed as being generally planar.

In such a case, the longitudinal axis 302 of the cone-shaped lens 101 can be substantially perpendicular to the substantially-planar member (such that the primary light-output surface 301 and the substantially-planar member are substantially parallel to one another). Such a configuration will serve beneficially in many application settings. These teachings will accommodate variations in these regards, however. It would be possible, for example, to orient the cone-shaped lens's longitudinal axis 302 at a 10 degree angle with respect to the lateral member 102, or at a 20 degree angle, or at a 30 degree angle, or at any other angle of choice.

Referring now momentarily to FIGS. 5 and 6, part or all of the aforementioned primary light-output surface 301 can include one or more spherically-shaped lenses 501. As shown in FIG. 6, these spherically-shaped lenses 501, in this illustrative example, each comprise a half sphere. Other configurations are possible. For example, each lens 501 might comprise only 45% of a complete sphere. Also as shown, these spherically-shaped lenses 501 are substantially identical to one another. Again, however, other possibilities can be accommodated in these regards. Some of these lenses 501 could differ with respect to each other as regards their basic geometric shape and/or with respect to their relative sizes as desired.

The purpose of these spherically-shaped lenses 501 is to scatter and diffuse the light from the aforementioned light source to thereby yield a diffused-light output. Generally speaking, such cone-shaped lenses 101, alone or in conjunction with the described spherically-shaped lenses 501, are well known in the art. Further elaboration in these regards will therefore not be provided here.

Using such spherical lens will of course increase to some extent the aggregate surface area of the primary light-output surface 301. It will be understood that the characterization made above (that the area of the exterior same-side surface area of the lateral member that extends beyond the light-output surface exceeds the area of the light-output surface by an amount that is at least four times the corresponding area of the light-output surface) refers to a plan view of the light-output surface that discounts and does not take into account any contributions to aggregate three-dimensional surface area that such spherical lenses might otherwise contribute.

As shown in FIG. 7, the lateral member 102 has an exterior same-side surface area 701 that extends beyond the primary light-output surface 301. Pursuant to these teachings this exterior same-side surface area 701 has an area that is at least four times the corresponding area of the cone-shaped lens's primary light-output surface 301. For many application purposes this ratio can be larger. By one approach, for example, the exterior same-side surface area 701 can be at least six times the area of the primary light-output surface 301. By another approach, this exterior same-side surface area 701 can be eight times the area of the primary light-output surface 301.

By one approach, and as illustrated here, the lateral member 102 extends outwardly from the cone-shaped lens 101 on all sides of the cone shaped lens 101. If desired, these teachings will accommodate other configurations in these regards.

By one approach, and again as illustrated here, the cone-shaped lens 101 is substantially centrally located within the periphery of the lateral member 102. And again, if desired, these teachings will accommodate other orientations.

For the sake of simplicity, the illustrated embodiments depict only a single cone-shaped lens 101. These teachings will accommodate, however, forming a lateral member 102 that integrally includes a plurality of cone-shaped lenses 101. In such a case, these cone-shaped lenses 101 can be substantially identical to one another or can, if desired, vary from one another. Such variations can relate to, for example, the length or width of the lens.

Those skilled in the art will recognize that there are various ways to form such a uni-piece component. Generally speaking, for many application settings it may be most economically appropriate to form this unitary component using a provided mold. This can comprise, for example, introducing the aforementioned material in a liquid form into the mold and then permitting the material to cure (by, for example, cooling and/or solidifying through some other process or phenomena) to thereby yield a solid single-piece component.

Those skilled in the art appreciate that a molded piece comprising a significant aggregate mass such as the cone-shaped lens in combination with the relatively thin lateral member presents considerable challenges. In particular, the lateral member will typically cool more quickly than the cone-shaped portion and this uneven cooling can lead to unwanted significant undulations (a so-called potato-chip effect) in the lateral member. ("Significant" undulations are those of sufficient dimension and orientation to be visibly contrary to an otherwise implied and intended form factor. This can include undulations that render the component mechanically unfit for its intended purpose).

To aid in avoiding this poor result, if desired, the lateral member 102 can have a periphery 801 that is thicker than non-peripheral portions 802 thereof. As illustrated, this can yield a non-peripheral part 802 that is recessed within the aforementioned periphery 801. For example, and without intending any specific limitations in these regards, the non-peripheral part 802 can be about 0.050 inches in thickness while the periphery 801 can be about 0.295 inches in thickness. (When recessing the non-peripheral part 802 as described above, and to continue with this same example, the non-peripheral part 802 can be recessed by 0.62 inches with respect to the upper surface of the periphery 801. While one skilled in the art might expect manufacturing problems when molding a part having such a relatively wide expanse of thin material in combination with a relatively large mass (the cone-shaped lens), the described use of a thicker periphery may alleviate such problems to at least some useful extent.

This bezel can be both aesthetically pleasing and structurally useful. A thickened periphery 801, for example, can both aid in maintaining the relative planarity of this member 102 as described and can further serve to encourage relative stability and security following installation of the member 102 in a corresponding housing. By one approach this bezel can effectively directly physically engage (i.e., without an intervening component aside from, if desired, a gasket or the like) and simultaneously hide (by occluding) the edges of the housing (at least when viewed from the front, and also from the side if so desired) and can in fact substitute for a separate bezel component that might otherwise be required for structural and/or aesthetic purposes.

If desired, the aforementioned exterior surface area of the lateral member 102 can be optically diffuse. More particularly, the lateral member 102 can be rendered more optically diffuse than the cone-shaped lens 101 (excluding such diffusion as may be introduced by optical features as tend to characterize the cone-shaped lens's primary light-output surface 301). So configured, this can render portions of the lateral member 102 that extend beyond the cone-shaped lens 101 generally only translucent (as versus transparent). This, in turn, can add to the aesthetic appeal of the overall component. Such treatment can also contribute to softening the boundary between the primary light-output surface 301 and the adjacent portions of the lateral member 102 by diffusing light within the housing that is not within the cone-shaped lens 101.

Also if desired, the aforementioned thickened periphery 801 can have a surface treatment to increase such optical diffusion beyond the diffusion employed for the non-peripheral part 802 of the lateral member 102. By one approach, this can include, for example, employing a diffusion pattern on both the exterior outward-facing side of the thickened periphery 801 as well as on the interior housing-facing side of the thickened periphery 801.

Figure 8:
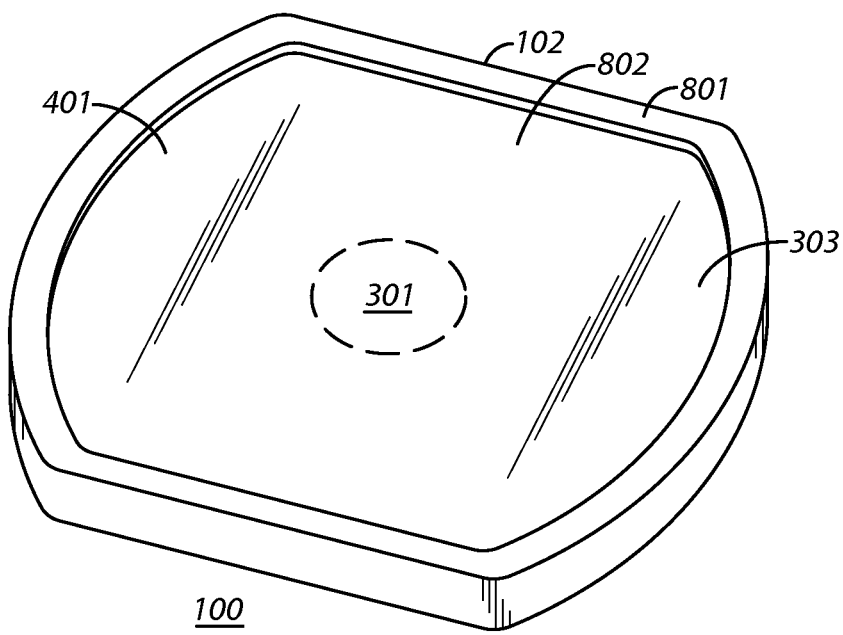
FIG. 8 comprises a perspective view as configured in accordance with various embodiments of the invention.

Referring now to FIG. 8, if desired, the lateral member 102 can have a periphery 801 that is thicker than non-peripheral portions 802 thereof. As illustrated, this can yield a non-peripheral part 802 that is recessed within the aforementioned periphery 801. This can be both aesthetically pleasing and structurally useful. A thickened periphery 801, for example, can aid in maintaining the relative planarity of this member 102 and can further serve to encourage relative stability and security following installation of the member 102 in a corresponding housing.

Figure 9:
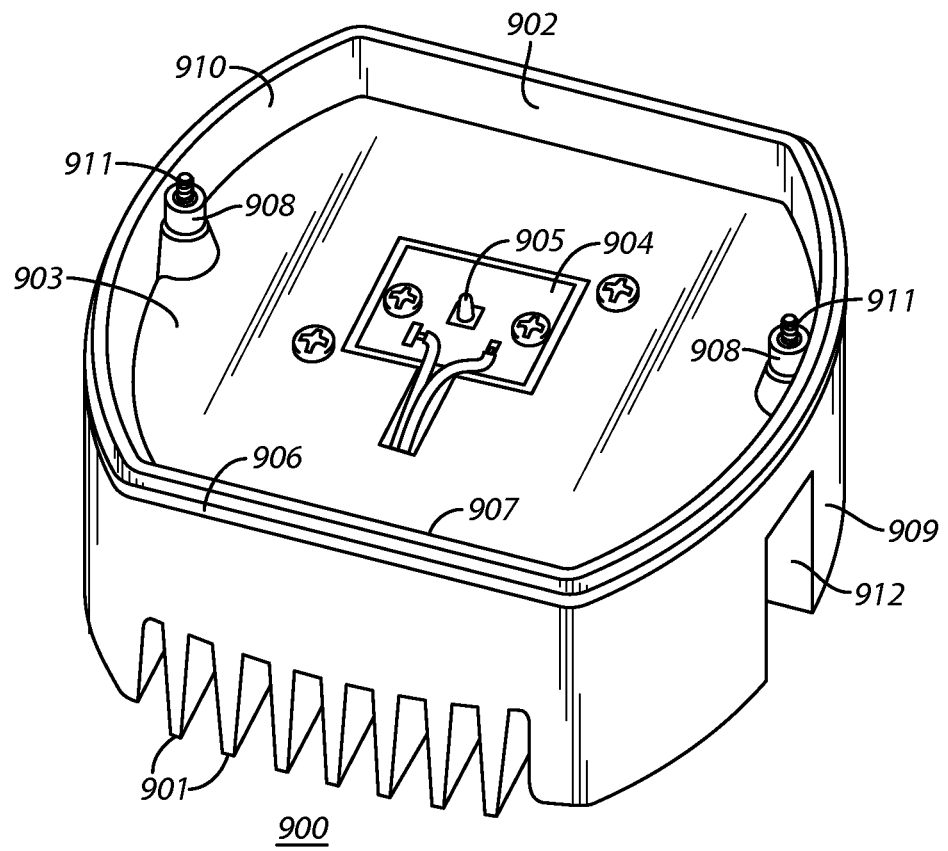
FIG. 9 comprises a perspective view as configured in accordance with various embodiments of the invention.
Figure 10:
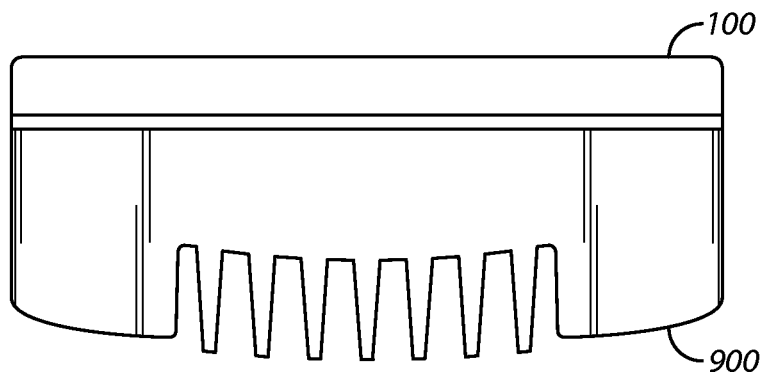
FIG. 10 comprises a front-elevational view as configured in accordance with various embodiments of the invention.

Referring now to FIGS. 9 and 10, an illustrative example of a housing suitable for use in conjunction with such a lens component 100 will be provided. It will be understood that this example serves in an illustrative capacity without any intention to suggest limitations in these regards.

The depicted housing 900 can be comprised of a suitable stable and solid material of choice. For some application settings this might include, for example, a plastic material of choice. For many application settings, however, this housing 900 can be comprised of a suitable metal such as aluminum (though other metals such as steel or a suitable alloy may be appropriate for some application settings). In such a case, the housing 900 can itself comprise a heat sink that is configured to transfer heat exuded by the light-emitting diode. By one approach, for example, this heat sink can include one or more heat sink fins 901 to dissipate this heat generated by the corresponding light source.

This housing 900 has an interior portion 902 that accommodates a metal plate 903 disposed and affixed there across. This metal plate 903 in turn supports a circuit board 904 having an LED 905 mounted thereon. In this illustrative example this LED 905 serves as a light source. Such LED's are well known and are available from a variety of sources include Cree, Inc. and Seoul Semiconductor, Inc.

This housing 900 has a small shelf 906 disposed largely continuously about the exterior periphery of the upper edge 907. The dimensions and placement of this shelf 906 compatibly mate with counterpart features on the above-described lens component 100 to thereby aid with respect to placing and holding the lens component 100 in an installed position with respect to the housing 900.

Figure 11:
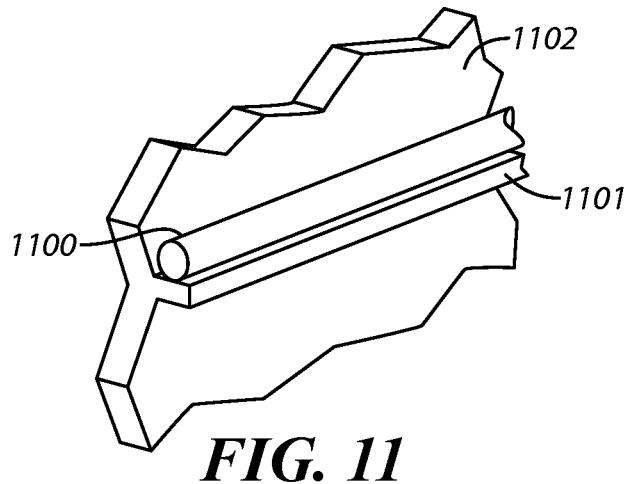
FIG. 11 comprises a perspective cutaway detail view as configured in accordance with various embodiments of the invention.
Figure 12:
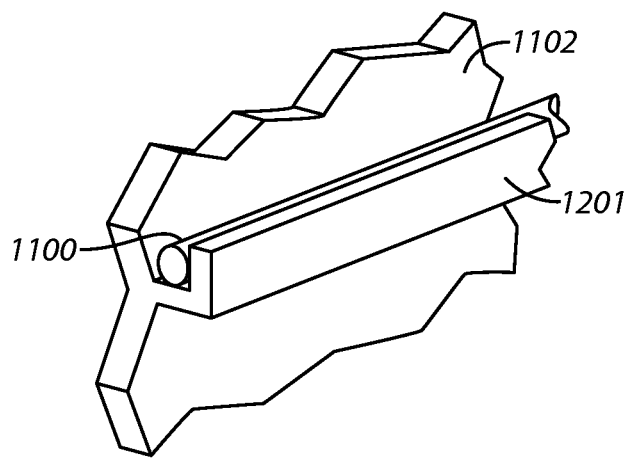
FIG. 12 comprises a perspective cutaway detail view as configured in accordance with various embodiments of the invention.

By one approach a gasket can be placed between the housing 900 and the lens component 100 to aid in preventing unwanted environmental elements from entering the interior of the housing 900 during use. With momentary reference to FIG. 11, by one approach this gasket 1100 can be disposed on a ridge, shelf, or gully 1101 that itself is integrally a part of a surface 1102 that comprises a part of either the lens component 100 or the housing 900 as desired (and which extends, for example, around such lens component or housing), where the ridge/shelf 1101 is configured and placed to permit the desired contact and interaction between the lens component 100 and the housing 900 when these two elements are coupled to one another in an installed configuration. Other approaches in these regards are of course possible. With momentary reference now to FIG. 12, for example, a U-shaped channel 1201 can serve in these same regards.

The gasket 1100 itself can comprise, for example, a somewhat deformable and/or elastic member (such as a ring-shaped member) that fits conformally in place. As another approach in these regards, the gasket 1100 can comprise a bead of somewhat-deformable material that is extruded into place during the manufacturing process. Generally speaking, the forming of gaskets and the placement of gaskets comprises a well understood area of endeavor that requires no further elaboration here.

By one approach, the housing 900 can further include two posts 908 disposed on opposing interior walls 909 and 910 thereof. These posts 908 can each have an opening axially disposed therethrough to receive a threaded securement member 911 such as a screw, bolt, or the like. Such a securement member 911 can be inserted into the opening via an access cavity 912 formed in the side walls of the housing 900 for this purpose. By one approach these securement members 911, when fully inserted, extend beyond the posts 908 and are hence available to aid in securing the lens component 100 to the housing 900 in an installed position.

To aid in these regards, and referring again momentarily to FIG. 1, the lens component 100 itself can include two posts 105 that are formed integrally to and as part of the lateral member 100 on the same side of the lateral member 100 and on opposing sides of the cone-shaped lens 101. Each post 105 can be provided with an axially-disposed opening 106 that is configured to securely receive the aforementioned securement members 911.

So configured, the lens component 100 can be easily and accurately placed in an installed position with respect to the housing 900 by simply placing the lens component 100 such that the described lens component posts 105 are in axial registration with their housing post 908 counterparts and then using the securement members 911 to affix the lens component 100 in the installed position. When installed as described, the LED 905 will also be properly disposed within the corresponding cavity 104 in the apex 103 of the cone-shaped lens 101.

It will be appreciated that these teachings are highly flexible in practice. In particular, these teachings can be leveraged and practiced in various ways to accommodate a wide variety of design and aesthetic requirements. This can even include, if desired, providing a resultant light fixture that mimics in appearance a traditional light fixture notwithstanding the use of newer light sources having widely divergent functional behaviors, form factors, and needs.

Figure 13:
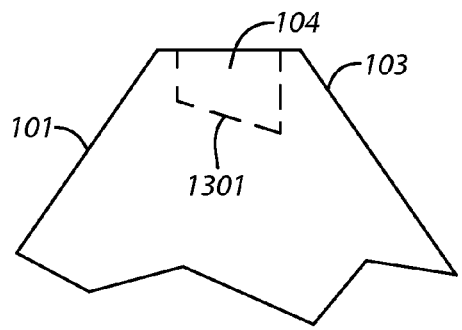
FIG. 13 comprises a front-elevational detail view as configured in accordance with various embodiments of the invention.
Figure 14:
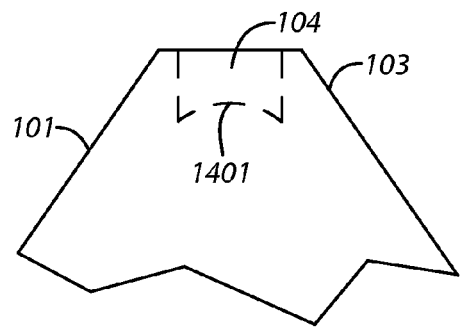
FIG. 14 comprises a front-elevational detail view as configured in accordance with various embodiments of the invention.
Figure 15:
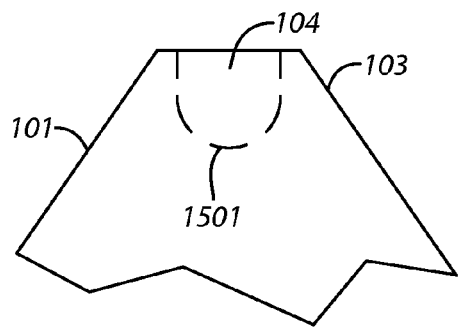
FIG. 15 comprises a front-elevational detail view as configured in accordance with various embodiments of the invention.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept. As one illustrative example in these regards, the aforementioned cavity 104 in the apex 103 of the cone-shaped lens 101 can have other than a cylindrical shape. For example, instead of having a circular cross section (as would typify a true cylinder), the cavity 104 can have a different shape such as an elliptical cross section, a rectangular cross section, and so forth. These teachings will also accommodate having cavity bottom that is other than a flat surface that is oriented substantially parallel to the primary light-output surface 301 of the cone-shaped lens 101. For example, as shown in FIG. 13, the cavity bottom can comprise a substantially-planar inclined surface 1301. As another example, and as shown in FIG. 14, the cavity bottom can comprise a substantially-convex surface 1401. As yet another example, and referring now to FIG. 15, the cavity bottom can comprise a substantially concave surface 1501. Other possibilities are of course possible depending upon the requirements and/or opportunities presented by a given application setting.

Figure 16:
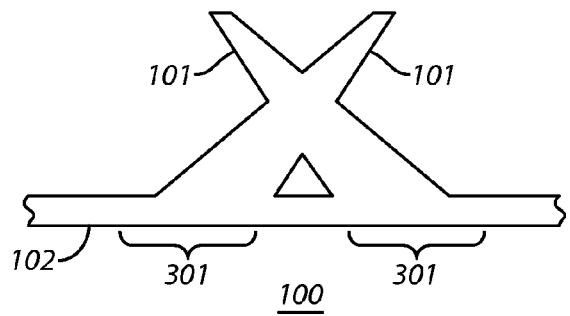
FIG. 16 comprises a front-elevational detail view as configured in accordance with various embodiments of the invention.
Figure 17:
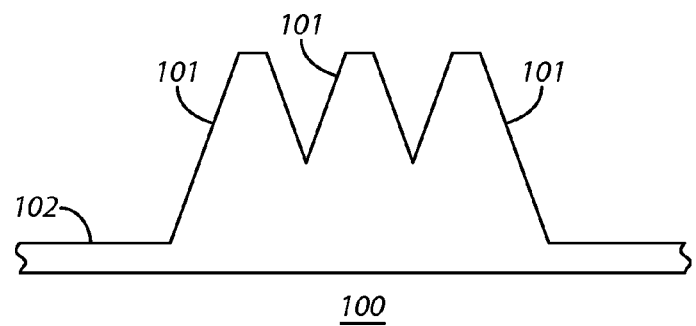
FIG. 17 comprises a front-elevational detail view as configured in accordance with various embodiments of the invention.

As another illustration of the considerable flexibility of these teachings, the aforementioned concept of providing a component 100 having a plurality of cone-shaped lenses 101 will accommodate, if desired, having two or more cone-shaped lenses 101 integrally intersect one another. By one approach, and as conceptually illustrated in FIG. 16, the two or more cone-shaped lenses 101 can intersect such that their corresponding primary light-output surfaces 301 are physically discrete from one another. By another approach, and as conceptually illustrated in FIG. 17, the two or more cone-shaped lenses 101 can intersect such that at least some of the cone-shaped lenses 101, share, at least in part, a light-output surface.

When employing a particular cavity 104 form factor and/or a particular approach to employing two or more intersecting cone-shaped lenses 101, those skilled in the art will recognize and understand that the particular orientations and dimensions employed in a given instance can be selected to accommodate, for example, design requirements or goals as pertain to such things as total internal reflection or the like as may apply to that given instance. This can further include utilizing within the cavity 104 particular materials (including both solid materials and semi-fluid materials) to serve a particular role as an index-of-refraction coupler to thereby match corresponding indices as desired.

I claim:

1. An apparatus comprising:
    a cone-shaped lens formed of a material and having a light-output surface having a corresponding area extending along a first plane, the light-output surface having a first optical diffusivity;

a lateral member that is formed integral to the cone-shaped lens of the material, wherein the lateral member has an exterior front-side surface area that extends along the first plane beyond the light-output surface and that has a periphery configured to physically engage and visually occlude a front edge of a corresponding housing when the lateral member is installed with respect to the housing, the lateral member having a second optical diffusivity that is more diffuse than the first optical diffusivity such that the lateral member is translucent.

2. The apparatus of claim 1 wherein the lateral member comprises a substantially-planar member.

3. The apparatus of claim 2 wherein the substantially-planar member is substantially perpendicular to a longitudinal axis of the cone-shaped lens.

4. The apparatus of claim 1 wherein the lateral member extends outwardly from the cone-shaped lens on all sides of the cone-shaped lens.

5. The apparatus of claim 1 wherein the cone-shaped lens is substantially centrally located within the lateral member.

6. The apparatus of claim 1 wherein the periphery has a portion that is thicker than a non-peripheral part of the lateral member.

7. The apparatus of claim 6 wherein the portion that is thicker diffuses light differently than the non-peripheral part of the lateral member.

8. The apparatus of claim 7 wherein the portion that is thicker is less transparent than the non-peripheral part of the lateral member.

9. The apparatus of claim 6 wherein the non-peripheral part is recessed within the periphery of the lateral member.

10. The apparatus of claim 1 further comprising:
a housing configured to engage and hold the lateral member in an installed position.

11. The apparatus of claim 10 further comprising:
at least one light source disposed within the housing such that the at least one light source is optically engaged with the cone-shaped lens when the lateral member is installed with respect to the housing.

12. The apparatus of claim 11 wherein the light source comprises a light-emitting diode.

13. The apparatus of claim 12 wherein the housing comprises a heat sink configured to transfer heat exuded by the light-emitting diode.

14. The apparatus of claim 13 wherein the heat sink comprises a plurality of heat sink fins configured to transfer heat exuded by the light-emitting diode.

15. The apparatus of claim 13 wherein the heat sink is at least substantially comprised of metal.

16. The apparatus of claim 15 wherein the metal comprises aluminum.

17. The apparatus of claim 1 further comprising:
a plurality of posts formed integral to the lateral member of the material and being configured to couple the lateral member to the housing to thereby install the lateral member with respect to the housing and to also position the cone-shaped lens with respect to a light source that is disposed within the housing.

18. The apparatus of claim 1 further comprising:
a gasket disposed between the lateral member and the housing when the lateral member is installed with respect to the housing.

19. The apparatus of claim 18 wherein the gasket is disposed on a ridge around the lateral member.

20. The apparatus of claim 18 wherein the gasket is formed in place using a liquid adhesive.

21. The apparatus of claim 1 further comprising:
at least one additional cone-shaped lens formed of the material and that is also formed integral to the lateral member.

22. The apparatus of claim 21 wherein the at least one additional cone-shaped lens physically intersects the cone-shaped lens.

23. The apparatus of claim 22 wherein the cone-shaped lens and the at least one additional cone-shaped lens share, at least in part, the light-output surface.

24. An apparatus comprising:
a cone-shaped lens formed of a material and having a primary light-output surface having a corresponding area extending along a first plane, the primary light-output surface having a first optical diffusivity;
a lateral member that is formed integral to the cone-shaped lens of the material, wherein the lateral member has an exterior front-side surface area that extends beyond the primary light-output surface along the first plane by an amount that is at least four times the corresponding area of the cone-shaped lens's primary light-output surface, the lateral member having a second optical diffusivity that is more diffuse than the first optical diffusivity such that the lateral member is translucent.

25. The apparatus of claim 24 wherein the exterior surface area is at least six times the corresponding area of the cone-shaped lens's light-output surface.

26. The apparatus of claim 24 wherein the exterior surface area is at least eight times the corresponding area of the cone-shaped lens's light-output surface.

27. The apparatus of claim 24 wherein the lateral member extends outwardly from the cone-shaped lens on all sides of the cone-shaped lens.

28. The apparatus of claim 24 wherein the cone-shaped lens is substantially centrally located within the lateral member.

29. The apparatus of claim 24 wherein the periphery has a portion that is thicker than a non-peripheral part of the lateral member.

30. The apparatus of claim 29 wherein the non-peripheral part is recessed within the periphery of the lateral member.

31. The apparatus of claim 24 further comprising:
a housing configured to engage and hold the lateral member in an installed position.

32. The apparatus of claim 31 further comprising:
at least one light source disposed within the housing such that the at least one light source is optically engaged with the cone-shaped lens when the lateral member is installed with respect to the housing.

33. An apparatus comprising:
a cone-shaped lens having a apex that is designed to accept light from a light emitter and having only one primary light-output surface formed at the base of the cone with a corresponding area extending along a first plane, the primary light-output surface having a first optical diffusivity;
a lateral member that is formed integral to the cone-shaped lens of the material and having a second optical diffusivity that is more diffuse than the first optical diffusivity such that the lateral member is translucent, wherein the lateral member has an exterior same-side planar surface area extending along the first plane that is at least four times greater than the corresponding area of the cone-shaped lens's primary light-output surface.

34. An apparatus comprising:
a lens component having only a single, primary light-output surface and a lateral member that surrounds the single, primary light-output surface, the single, primary light-output surface having a first optical diffusivity and the lateral member having a second optical diffusivity that is more diffuse than the first optical diffusivity; and
a cone-shaped lens having an apex configured to accept light from a light emitter, the single, primary light-output surface being formed at a base of the cone-shaped lens and having a corresponding area,
the lateral member being formed integral to the cone-shaped lens and including an exterior front-side surface area that is at least four times greater than the corresponding area of the single, primary light-output surface.

* * * * *